US012713032B2

(12) United States Patent
Sun et al.

(10) Patent No.: US 12,713,032 B2
(45) Date of Patent: Aug. 18, 2026

(54) POWER MANAGEMENT METHOD THAT CAN PROVIDE FREQUENCY FRAME BY FRAME TO DRIVE VIDEO DECODER

(71) Applicant: MEDIATEK INC., Hsinchu City (TW)

(72) Inventors: Shan-Chiang Sun, Hsinchu City (TW); Kuan-Hung Chou, Hsinchu City (TW); Min-Han Tsai, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 19/001,575

(22) Filed: Dec. 26, 2024

(65) Prior Publication Data

US 2026/0189711 A1 Jul. 2, 2026

(51) Int. Cl.
*H04N 19/156* (2014.01)
*H04N 19/115* (2014.01)
*H04N 19/172* (2014.01)
*H04N 19/503* (2014.01)

(52) U.S. Cl.
CPC ......... *H04N 19/156* (2014.11); *H04N 19/115* (2014.11); *H04N 19/172* (2014.11); *H04N 19/503* (2014.11)

(58) Field of Classification Search
CPC .. H04N 19/124; H04N 19/152; H04N 19/593; H04N 19/103; H04N 19/174; H04N 19/176; H04N 19/44; H04N 19/14; H04N 19/149; H04N 19/15
USPC ........................................................ 375/240
See application file for complete search history.

(56) References Cited

U.S. PATENT DOCUMENTS

2020/0186810 A1* 6/2020 Zheludkov ........... H04N 19/124
2024/0022737 A1* 1/2024 Zhao .................... H04N 19/176

OTHER PUBLICATIONS

Ben Lee et al., Dynamic voltage scaling techniques for power efficient video decoding, Journal of Systems Architecture 51 (2005), pp. 633-652, XP005092496, 2005.
Christian Herglotz et al., Complexity Metrics for VVC Decoder Power Reduction in Green Metadata, 2024 Picture Coding Symposium (PCS) IEEE, 2024, XP034625826, 2024.

* cited by examiner

*Primary Examiner* — Masum Billah
(74) *Attorney, Agent, or Firm* — Winston Hsu

(57) ABSTRACT

A power management method includes: receiving an input video signal, wherein the input video signal comprises multiple frames; extracting at least one video feature from each of the multiple frames; performing a prediction operation according to the at least one video feature to generate a coarse prediction result, wherein the coarse prediction result is indicative of a value of a required power of the each of the multiple frames; and for the each of the multiple frames, adjusting a frequency of a video decoder according to a refined prediction result to drive the video decoder, wherein the refined prediction result is an error calibrated version of the coarse prediction result.

4 Claims, 4 Drawing Sheets

POWER MANAGEMENT METHOD THAT CAN PROVIDE FREQUENCY FRAME BY FRAME TO DRIVE VIDEO DECODER

BACKGROUND

The present invention is related to power management for a video decoder, and more particularly, to a power management method that can provide a frequency frame by frame to drive the video decoder, and an associated non-transitory machine-readable medium.

The decoding operations performed upon multiple frames included in an input video signal by a video decoder require different computing power. For a conventional method, a fixed computing power setting corresponding to an expected worst case scenario may be recorded into a lookup table, and a resource controllable module may refer to the lookup table for adjusting a frequency of the video decoder through the fixed computing power setting. Some problems may occur, however. Since the computing power required by most of the multiple frames may be less than fixed computing power corresponding to the expected worst case scenario, the power consumption may be increased. In addition, for a corner case (e.g., a case where most of the multiple frames require computing power greater than the fixed computing power), the conventional method may cause delays during the decoding process, and thereby cause frame drop problems and reduce the overall performance. As a result, a novel power management method for the video decoder that can calculate required computing power frame by frame, and adaptively adjust the frequency of the video decoder according to the calculated computing power (i.e., an accurate frequency is provided frame by frame to drive the video decoder), is urgently needed.

SUMMARY

It is therefore one of the objectives of the present invention to provide a power management method that can provide a frequency frame by frame to drive a video decoder, and an associated non-transitory machine-readable medium, to address the above-mentioned issues.

According to an embodiment of the present invention, a power management method is provided. The power management method comprises: receiving an input video signal, wherein the input video signal comprises multiple frames; extracting at least one video feature from each of the multiple frames; performing a prediction operation according to the at least one video feature to generate a coarse prediction result; and for the each of the multiple frames, adjusting a frequency of a video decoder according to a refined prediction result to drive the video decoder, wherein the refined prediction result is an error calibrated version of the coarse prediction result, and is indicative of a value of a required power of the each of the multiple frames.

According to an embodiment of the present invention, a non-transitory machine-readable medium is provided. The non-transitory machine-readable medium is arranged to store a program code, wherein when loaded and executed by a processor, the program code instructs the processor to execute software modules, and the software modules comprise a video driver, a prediction module, and a resource controllable module. The video driver is arranged to receive an input video signal, and extract at least one video feature from each of multiple frames, wherein the input video signal comprises the multiple frames. The prediction module comprises a prediction model, wherein the prediction model is arranged to perform a prediction operation according to the at least one video feature to generate a coarse prediction result. The clock module is arranged to adjust a frequency of a video decoder according to a refined prediction result for the each of the multiple frames, to drive the video decoder, wherein the refined prediction result is an error calibrated version of the coarse prediction result, and is indicative of a value of a required power of the each of the multiple frames.

One of the benefits of the present invention is that, by the power management method proposed by the present invention, required computing power can be calculated frame by frame, and a frequency of a video decoder (i.e., an operation speed of the video decoder) can be adaptively adjusted/configured according to the calculated computing power. In this way, the power consumption of the video decoder can be optimized, and therefore the overall performance can be prevented from being reduced (e.g., the overall performance can be maintained) without sacrificing the power consumption.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms “include” and “comprise” are used in an open-ended fashion, and thus should be interpreted to mean “include, but not limited to . . . ”.

Figure 1:
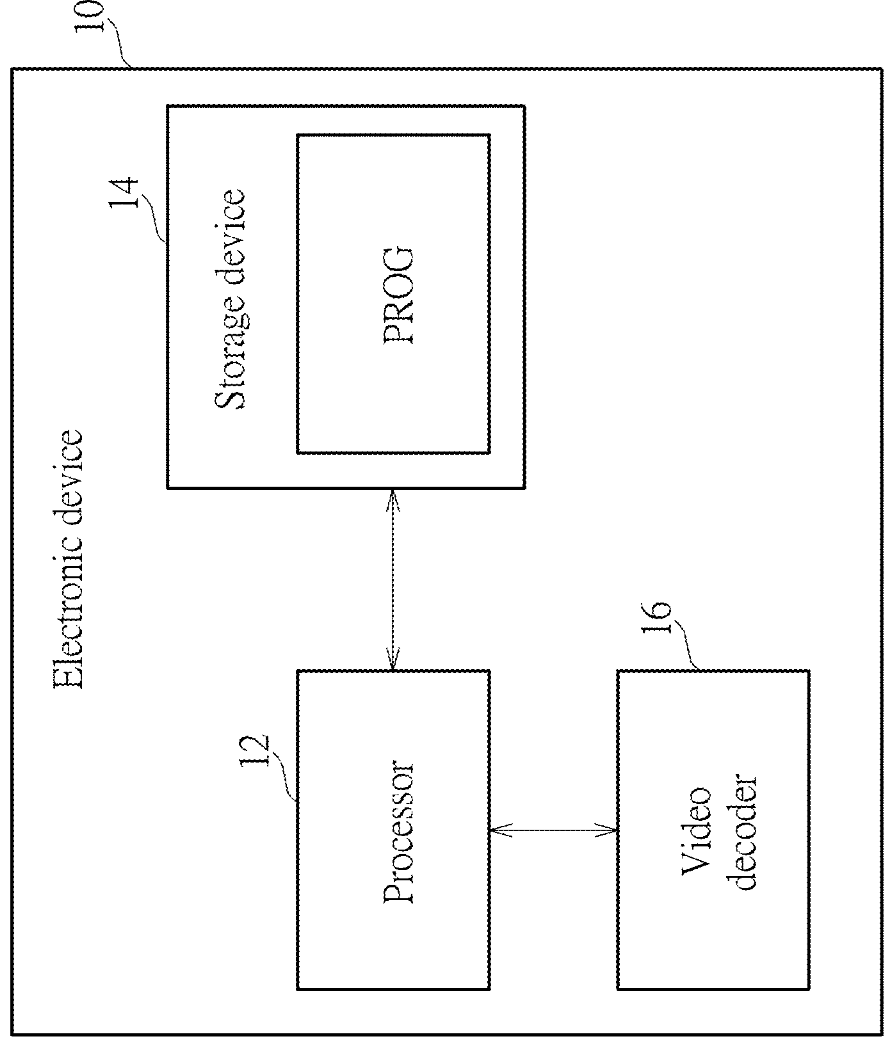
FIG. 1 is a diagram illustrating an electronic device according to an embodiment of the present invention.

FIG. 1 is a diagram illustrating an electronic device 10 according to an embodiment of the present invention. By way of example, but not limitation, the electronic device 10 may be a portable device such as a smartphone or a tablet. The electronic device 10 may include a processor 12, a storage device 14, and a video decoder 16. The processor 12 may be a single-core processor or a multi-core processor. The storage device 14 is a computer-readable medium, and is arranged to store computer program code PROG. The processor 12 is equipped with software execution capability. The computer program code PROG may include a plurality of software modules. Hence, when loaded and executed by the processor 12, the computer program code PROG instructs the processor 12 to perform designated functions of the software modules. The electronic device 10 may be regarded as a computer system using a computer program product that includes a computer-readable medium containing the computer program code PROG. The video decoder 16 is a hardware accelerator that may perform designated functions (e.g., video decoding). Regarding a video decoding system proposed by the present invention, it may be embodied on the electronic device 10. For example, the video decoding system may include software-based functions implemented by the computer program code PROG running on the processor 12 and/or hardware-based functions implemented by the video decoder 16.

Figure 2:
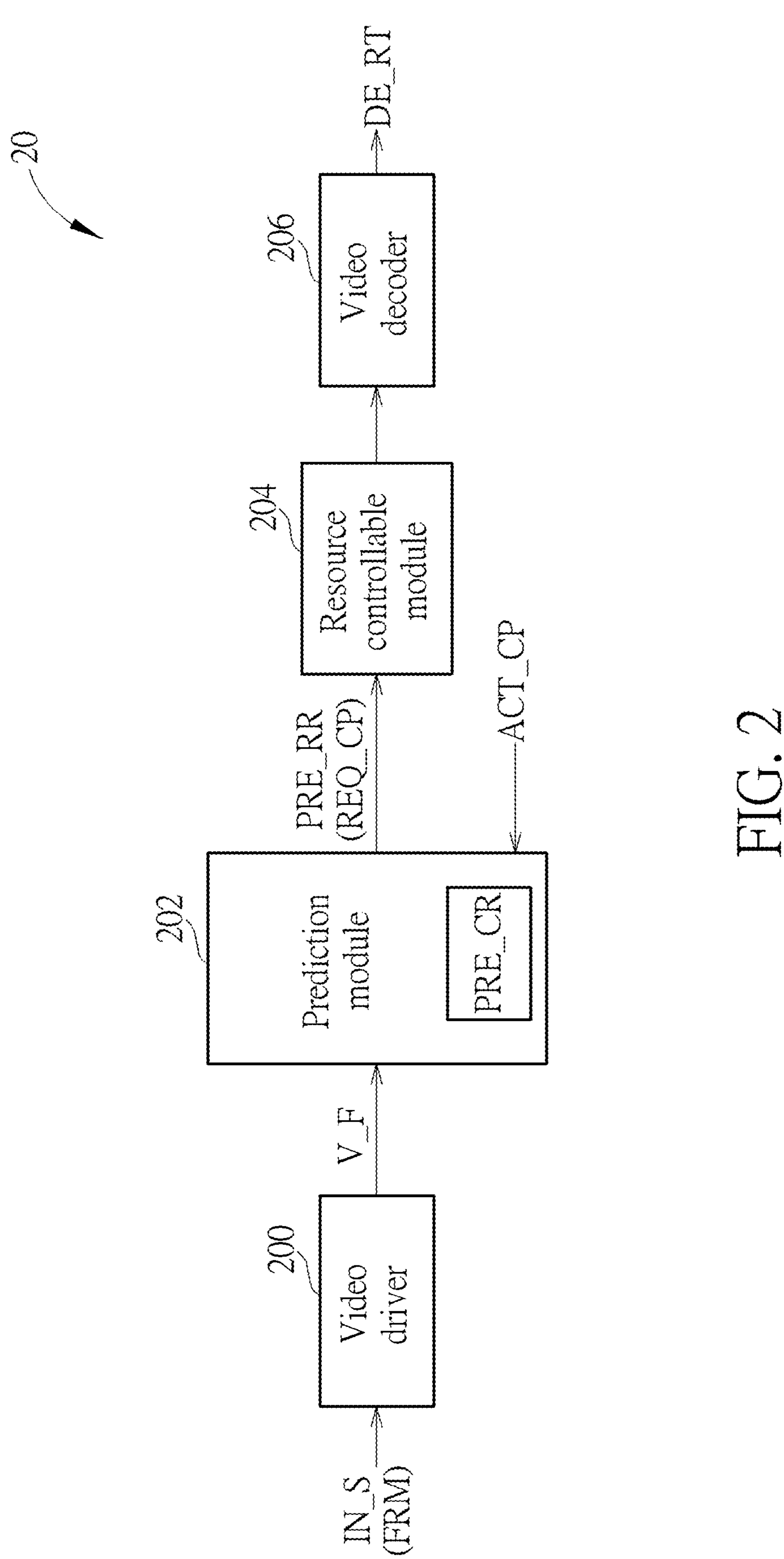
FIG. 2 is a diagram illustrating a video decoding system according to an embodiment of the present invention.

FIG. 2 is a diagram illustrating a video decoding system 20 according to an embodiment of the present invention. The video decoding system 20 may include a processor (e.g. the processor 12 shown in FIG. 1) and a video decoder 206. The processor may be arranged to execute software modules, including a video driver 200, a prediction module 202, and a resource controllable module 204, but the present invention is not limited thereto. In some embodiments, the resource controllable module 204 may be pure hardware that may perform frequency adjustment for the video decoder 206 without software execution.

The video driver 200 may be arranged to receive an input video signal IN_S including multiple frames FRM, and may perform pre-processing upon a bitstream of the input video signal IN_S to generate a pre-processed result. For example, the video driver 200 may extract at least one video feature V_F from each of the frames FRM (more particularly, from the pre-processed result corresponding to each frame), and input the at least one video feature V_F into the prediction module 202 for subsequent prediction operations. That is, the video feature extraction operation may be performed frame by frame to obtain the at least one video feature V_F. The at least one video feature V_F may be associated with computing power requirements of each frame, and may include, but is not limited to: codec type, frame size, resolution, frame rate, profile, level, frame type, or a combination thereof.

Figure 3:
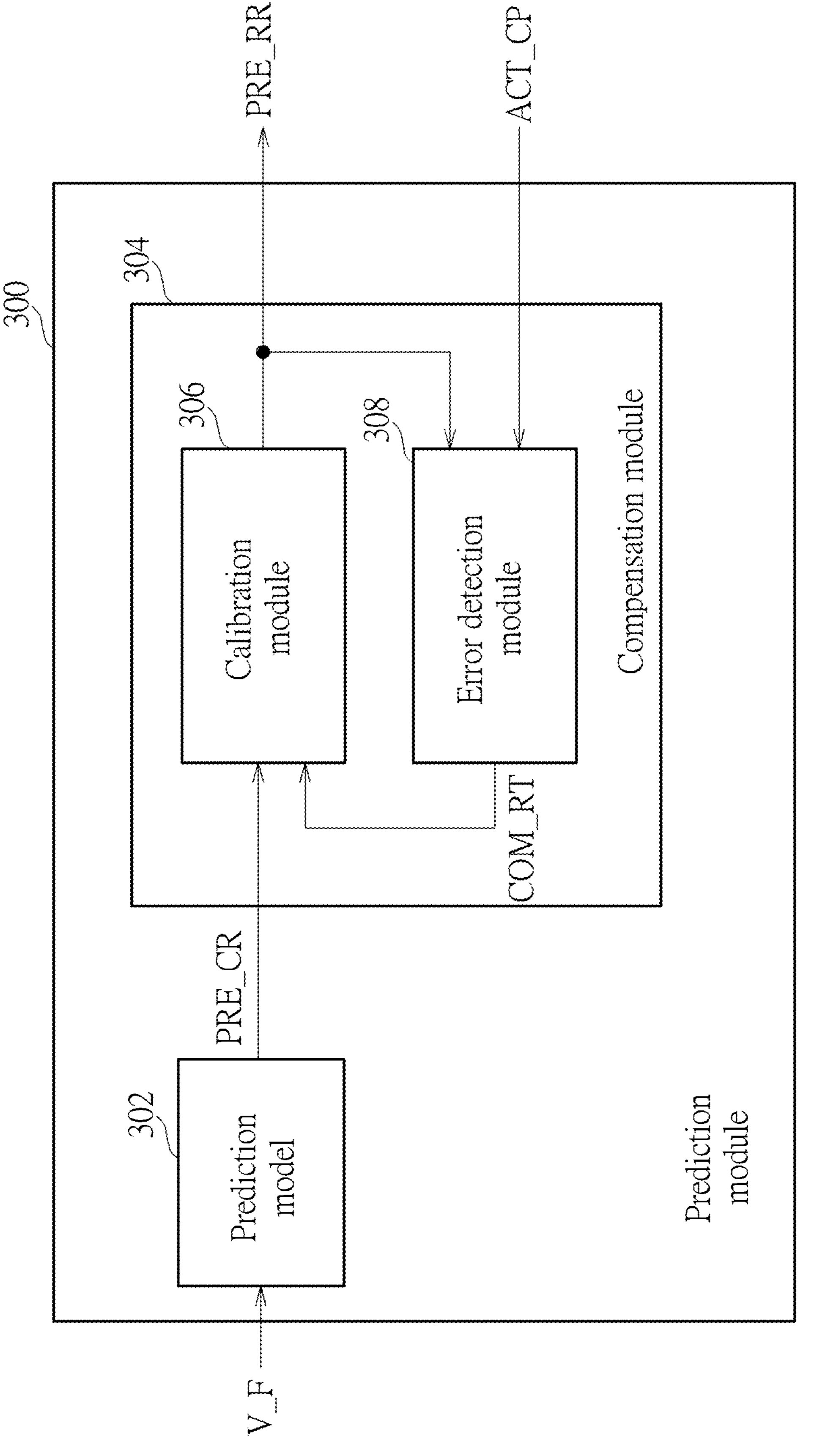
FIG. 3 is a diagram illustrating a prediction module according to an embodiment of the present invention.

The prediction module 202 may be arranged to generate a coarse prediction result PRE_CR according to the at least one video feature V_F. In addition, the prediction module 202 may be further arranged to perform an error detection operation and a calibration operation according to the coarse prediction result PRE_CR to obtain a refined prediction result PRE_RR, wherein the refined prediction result PRE_RR is an error calibrated version of the coarse prediction result PRE_CR, and is indicative of a value of a required computing power REQ_CP for each frame. The resource controllable module 204 may be arranged to adjust/configure a frequency of the video decoder 206 (i.e., an operation speed of the video decoder 206) according to the refined prediction result PRE_RR to drive the video decoder 206 and optimize the power consumption of the video decoder 206. For example, for each frame, the resource controllable module 204 may adjust/configure the frequency of the video decoder 206 as an optimal frequency according to the refined prediction result PRE_RR. The video decoder 206 may be arranged to perform a decoding operation upon each frame, to generate a decoding result DE_RT for subsequent processing. In addition, after the frequency of the video decoder 206 is adjusted/configured, the video decoder 206 may store a value of an actual computing power ACT_CP corresponding to each frame into the storage device 14, wherein the value of the actual computing power ACT_CP may be transmitted back to the prediction module 202. The prediction module 202 may be further arranged to derive the refined prediction result PRE_RR from the coarse prediction result PRE_CR according to the value of the actual computing power ACT_CP. In detail, please refer to FIG. 3. FIG. 3 is a diagram illustrating a prediction module 300 according to an embodiment of the present invention, wherein the prediction module 202 shown in FIG. 2 may be implemented by the prediction module 300.

As shown in FIG. 3, the prediction module 300 may include a prediction model 302 and a compensation module 304, wherein both the prediction model 302 and the compensation module 304 may be implemented by algorithms that are included in the computer program code PROG and executed by the processor 12, and the compensation module 304 may include a calibration module 306 and an error detection module 308. The prediction model 302 may perform a prediction operation according to the at least one video feature V_F acting as input data, to generate the coarse prediction result PRE_CR. The compensation module 304 may be arranged to perform a feedback control operation upon the coarse prediction result PRE_CR according to the value of the actual computing power ACT_CP and the value of the required computing power REQ_CP indicated by the refined prediction result PRE_RR, to compensate prediction errors of the coarse prediction result PRE_CR, for generating the refined prediction result PRE_RR.

Specifically, the calibration module 306 may obtain the coarse prediction result PRE_CR and a comparison result COM_RT from the prediction module 302 and the error detection module 308, respectively, and perform an error calibration operation upon the coarse prediction result PRE_CR according to the comparison result COM_RT to generate the refined prediction result PRE_RR, wherein the comparison result COM_RT is indicative of a difference between the value of the actual computing power ACT_CP and the value of the required computing power REQ_CP, and the refined prediction result PRE_RR is indicative of the value of the required computing power REQ_CP after the error calibration operation is performed. The error detection module 308 may be arranged to obtain the refined prediction result PRE_RR and the value of the actual computing power ACT_CP from the calibration module 306 and the storage device 14, respectively, and compare the value of the actual computing power ACT_CP with the value of the required computing power REQ_CP to generate the comparison result COM_RT, for performing the feedback control operation upon the coarse prediction result PRE_CR.

Figure 4:
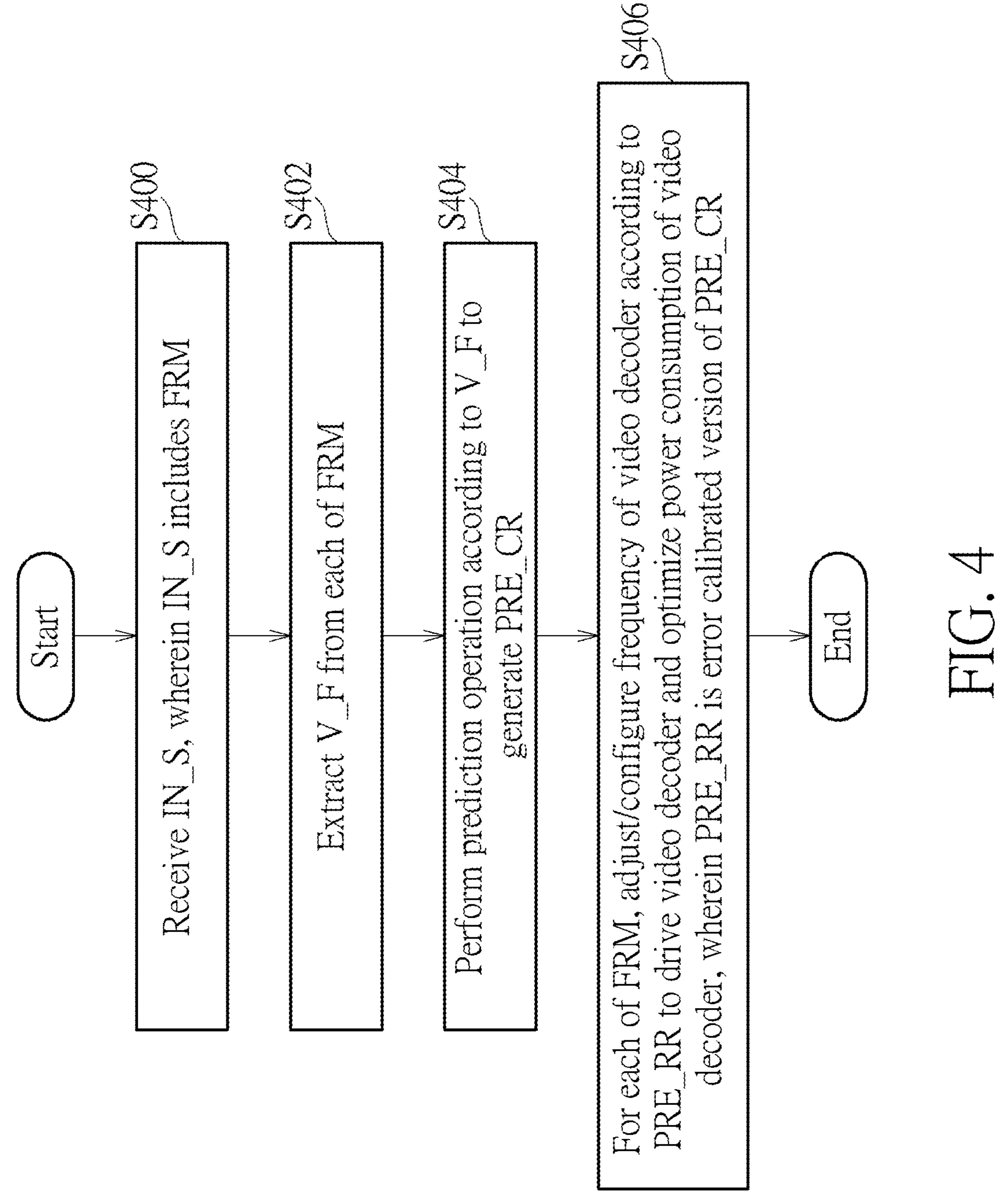
FIG. 4 is a flow chart of a power management method according to an embodiment of the present invention.

FIG. 4 is a flow chart of a power management method according to an embodiment of the present invention. Provided that the result is substantially the same, the steps are not required to be executed in the exact order shown in FIG. 4. For example, the power management method shown in FIG. 4 may be employed by the video decoding system 20 shown in FIG. 2.

In Step S400, the input video signal IN_S is received, wherein the input video signal IN_S includes the frames FRM.

In Step S402, the at least one video feature V_F is extracted from each of the frames FRM.

In Step S404, a prediction operation is performed according to the at least one video feature V_F to generate the coarse prediction result PRE_CR.

In Step S406, for each of the frames FRM, a frequency of a video decoder (i.e., an operation speed of the video decoder) is adjusted/configured according to the refined prediction result PRE_RR to drive the video decoder and optimize the power consumption of the video decoder, wherein the refined prediction result PRE_RR is an error calibrated version of the coarse prediction result PRE_CR, and is indicative of a value of the required computing power REQ_CP of the each of the frames FRM.

Since a person skilled in the pertinent art can readily understand details of the steps after reading above paragraphs directed to the video decoding system 20 shown in FIG. 2, further descriptions are omitted here for brevity.

In summary, by the power management method proposed by the present invention, required computing power can be calculated frame by frame, and a frequency of a video decoder (i.e., an operation speed of the video decoder) can be adaptively adjusted/configured according to the calculated computing power. In this way, the power consumption of the video decoder can be optimized, and therefore the overall performance can be prevented from being reduced (e.g., the overall performance can be maintained) without sacrificing the power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power management method, comprising:

receiving an input video signal, wherein the input video signal comprises multiple frames;

extracting at least one video feature from each of the multiple frames, wherein the at least one video feature comprises codec type, frame size, resolution, frame rate, profile, level, frame type, or a combination thereof;

performing a prediction operation according to the at least one video feature to generate a coarse prediction result; and for the each of the multiple frames, adjusting a frequency of a video decoder according to a refined prediction result to drive the video decoder, wherein the refined prediction result is an error calibrated version of the coarse prediction result, and is indicative of a value of a required power of the each of the multiple frames;

wherein the power management method further comprises:

comparing a value of an actual power corresponding to the each of the multiple frames with the value of the required power to generate a comparison result; and performing an error calibration operation upon the coarse prediction result according to the comparison result, to generate the refined prediction result.

2. The power management method of claim 1, further comprising:

after the frequency of the video decoder is adjusted, storing the value of the actual power corresponding to the each of the multiple frames into a storage device.

3. A non-transitory machine-readable medium for storing a program code, wherein when loaded and executed by a processor, the program code instructs the processor to execute software modules comprising:

a video driver, arranged to receive an input video signal, and extract at least one video feature from each of multiple frames, wherein the input video signal comprises the multiple frames, and the at least one video feature comprises codec type, frame size, resolution, frame rate, profile, level, frame type, or a combination thereof;

a prediction module, comprising a prediction model, wherein the prediction model is arranged to perform a prediction operation according to the at least one video feature to generate a coarse prediction result; and a resource controllable module, arranged to adjust a frequency of a video decoder according to a refined prediction result for the each of the multiple frames, to drive the video decoder, wherein the refined prediction result is an error calibrated version of the coarse prediction result, and is indicative of a value of a required power of the each of the multiple frames;

wherein the prediction module further comprises:

an error detection module, arranged to compare a value of an actual power corresponding to the each of the multiple frames with the value of the required power to generate a comparison result; and a calibration module, arranged to perform an error calibration operation upon the coarse prediction result according to the comparison result, to generate the refined prediction result.

4. The non-transitory machine-readable medium of claim 3, wherein after the frequency of the video decoder is adjusted, the video decoder stores the value of the actual power corresponding to the each of the multiple frames into a storage device.

* * * * *